(12) United States Patent
Harr

(10) Patent No.: US 6,421,479 B1
(45) Date of Patent: Jul. 16, 2002

(54) APPARATUS AND METHOD FACILITATING OPTICAL ALIGNMENT OF A BULK OPTICAL MULTIPLEXER/DEMULTIPLEXER

(75) Inventor: Robert Harr, Arvada, CO (US)

(73) Assignee: Zolo Technologies, Inc., Louisville, CO (US)

(*) Notice: Subject to any disclaimer, the term of this patent is extended or adjusted under 35 U.S.C. 154(b) by 75 days.

(21) Appl. No.: 09/702,550

(22) Filed: Oct. 31, 2000

(51) Int. Cl.⁷ .............................................. G02B 6/28
(52) U.S. Cl. ............................ 385/24; 385/10; 385/31; 385/37
(58) Field of Search .............................. 385/10, 24, 31, 385/37

(56) References Cited

U.S. PATENT DOCUMENTS

| | | | |
|---|---|---|---|
| 4,652,080 A | 3/1987 | Carter et al. | 385/47 |
| 4,718,056 A | 1/1988 | Schultheiss | 359/131 |
| 4,763,969 A | 8/1988 | Khoe et al. | 385/37 |
| 5,018,831 A | 5/1991 | Wyatt | 359/566 |
| 5,195,707 A | 3/1993 | Ignatuk et al. | 348/179 |
| 5,757,536 A | 5/1998 | Ricco et al. | 359/224 |
| 5,905,827 A * | 5/1999 | Naganuma et al. | 385/31 |
| 6,055,348 A | 4/2000 | Jin et al. | 385/37 |
| 6,094,448 A | 7/2000 | Fomenkov et al. | 372/102 |
| 6,108,471 A * | 8/2000 | Zhang et al. | 385/24 |
| 6,111,674 A | 8/2000 | Bhagavatula | 359/124 |
| 6,263,134 B1 * | 7/2001 | Laude | 385/24 |
| 6,275,630 B1 * | 8/2001 | Yang et al. | 385/24 |
| 6,304,692 B1 * | 10/2001 | Sappy et al. | 385/24 |

* cited by examiner

Primary Examiner—Georgia Epps
Assistant Examiner—M. Hasan
(74) Attorney, Agent, or Firm—Swanson & Bratschun LLC (57) ABSTRACT

A bulk optic (de)multiplexer for fiber optic communications systems includes a diffraction grating having a diffraction surface, a waveguide array including a plurality of waveguides having an input/output end for emitting and receiving optical signals, and a focusing optic in optical communication between the diffraction grating and the waveguide array along an optical axis. The focusing optic focuses beams from the diffraction surface of the grating for optical coupling with the input/output ends of the waveguides. The (de)multiplexer further includes a frame. A fixed mount is provided between the focusing optic and the frame. A first adjustable mount is provided between the waveguide array and the frame and a second adjustable mount is provided between the diffraction grating and the frame. Preferably, the optical axis corresponds to a Z axis of orthogonal X, Y, Z axes and the waveguides of the waveguide array are aligned with the input/output ends along an input/output axis. The first adjustable mount is configured to provide for linear movement of the waveguide array along the Z axis and movement of the input/output axis within a plane parallel to the X, Y axes. The second adjustable mount is preferably configured to provide only for gimbaled movement of the grating about the point on the diffraction surface of the grating intersecting the optical axis. A method of optically aligning a (de)multiplexer as described above includes affixing the focusing optic to the frame with the focusing optic defining the optical axis, moving the waveguide array relative to the focusing optic only linearly along the optical axis and moving the grating only by rotating the grating about three orthogonal axes at a point on the grating intersected by the optical axis.

19 Claims, 7 Drawing Sheets

APPARATUS AND METHOD FACILITATING OPTICAL ALIGNMENT OF A BULK OPTICAL MULTIPLEXER/DEMULTIPLEXER

RELATED APPLICATIONS

This application claims priority from the commonly-owned utility application filed concurrently with the present application entitled "Thermally Stable Multiplexer/Demultiplexer," which is incorporated herein in its entirety.

TECHNICAL FIELD

The present invention is directed towards optical communications, and more particularly toward a structure facilitating alignment of the optical elements of a bulk optical multiplexer/demultiplexer.

BACKGROUND ART

At the inception of fiber optic communications, typically a fiber was used to carry a single channel of data at a single wavelength. Dense wavelength division multiplexing (DWDM) enables multiple channels at distinct wavelengths within a given wavelength band to be sent over a single mode fiber, thus greatly expanding the volume of data that can be transmitted per optical fiber. The wavelength of each channel is selected so that channels do not interfere with each other and the transmission losses to the fiber are minimized. While typical DWDM allows up to 40 channels to be simultaneously transmitted by a fiber, there is an ongoing effort to further increase the number of channels transmitted for a given wavelength band by an optical fiber.

DWDM requires two conceptually symmetric devices: a multiplexer and a demultiplexer. A multiplexer takes multiple beams or channels of light, each at a discreet wavelength and from a discreet source and combines the channels into a single multi-channel or multiplexed beam. The input is typically a linear array of waveguides such as a linear array of optical fibers. The output is typically a single waveguide such as an optical fiber. A demultiplexer spatially separates a multiplexed beam into separate channels according to wavelength. Input is typically a single input waveguide or fiber and the output is typically a linear array of waveguides such as optical fibers.

There are a number of different DWDM devices known in the art, including array waveguides (see Li, U.S. Pat. No. 5,706,377), devices using a network of filters and/or fiber Bragg gratings for channel separation (see Pan, U.S. Pat. No. 5,748,350), and a variety of bulk optical DWDM devices. Bulk optical multiplexers and demultiplexers consist of discreet optically aligned optical elements. For example, a wavelength dispersive element such as a reflective diffraction grating, a focusing optic such as a lens, and a waveguide array which may consist of a multi-channel or multiplex waveguide such as a single mode optical fiber and a linear array of single channel waveguides, typically also single mode optical fibers. In a demultiplexing operation, the multi-channel or multiplexed optical signal is emitted from the multi-channel waveguide, directed through and collimated by the focusing optic, and reflected off the diffraction grating. The diffraction grating divides the multi-channel beam into single channel beam components which are reflected through the focusing optic and focused by the focusing optic to optical focal points coupling with the single channel optical waveguides. The multiplexer simply works in reverse, with single channel signals being emitted from the single channel optical fibers, combined into a multiplex signal and coupled to the multiplex optical fiber. Because a single device can perform as a multiplexer or a demultiplexer, it is referred to as a (de)multiplexer herein. Critical to the proper operation of a bulk optic (de) multiplexer is maintaining proper optical alignment of the waveguide array, focusing optic, and diffraction grating to provide efficient coupling of the optical signals to the respective waveguides with minimal or no crosstalk. To date, providing a structure for facilitating proper alignment of the optical elements and for maintaining the optical elements in the desired optical alignment has proven illusive.

Schultheiss, U.S. Pat. No. 4,718,056, is directed to a bulk optical (de)multiplexer including a diffraction grating, a lens and an optical fiber harness. In Schultheiss, the diffraction grating, lens, and fiber harness are all mounted to a frame by adjustable mounts. While having each of the optical elements on its own adjustable mount clearly makes it possible to optimize the optical alignment of the (de)multiplexer optical elements, it actually over complicates alignment because none of the optical elements are fixed relative to the frame to provide a reference point, thus necessitating adjustment of each element during optical alignment.

Ignatuc, U.S. Pat. No. 5,195,707, is directed to an optic positioning device for holding an optical element which has a center and for adjusting the optical element relative to the center. The positioning device includes a supporting base having a concave spherical surface and a holding body having a convex spherical surface which is slidably mated with the concave spherical surface. Both the concave and convex spherical surfaces have radial centers at the center of the optical element. Ignatuc allows for gimbaled movement of the optical element about its optical center. However, the mating concave and convex spherical surfaces provide a large surface contact area which can make it difficult to make small, precise movements of the optical element due to "sticktion" between the surfaces. Ignatuc also requires that both spherical surfaces be made to precise tolerances in order to insure the center of the optical element remains at a fixed location. This increases manufacturing costs.

The present invention is intended for overcoming one or more of the problems discussed above.

SUMMARY OF THE INVENTION

A first aspect of the invention is a bulk optic (de) multiplexer for fiber optic communications systems including a diffraction grating having a diffraction surface, a waveguide array including a plurality of waveguides having an input/output end for emitting and receiving optical signals, and a focusing optic in optical communication between the diffraction grating and the waveguide array along an optical axis. The focusing optic focuses beams from the diffraction surface of the grating for optical coupling with the input/output ends of the waveguides. The (de)multiplexer further includes a frame. A fixed mount is provided between the focusing optic and the frame. A first adjustable mount is provided between the waveguide array and the frame and a second adjustable mount is provided between the diffraction grating and the frame. Preferably, the optical axis corresponds to a Z axis of orthogonal X, Y, Z axes and the waveguides of the waveguide array are aligned with the input/output ends along an input/output axis. The first adjustable mount is configured to provide for linear movement of the waveguide array along the Z axis and independent movement of the input/output axis within a plane parallel to the X, Y axes. The second adjustable mount is preferably configured to provide only for gimbaled movement of the grating about a point on the diffraction surface of the grating intersecting the optical axis.

A second aspect of the present invention is an attachment assembly for attaching a diffraction grating having a diffraction surface of an optical (de)multiplexer to a frame of the (de)multiplexer, the (de)multiplexer having optical elements in addition to the grating, the optical elements being attached to the frame and aligned along an optical axis. The attachment assembly includes a grating mount having a leading surface to which the grating is attached with a diffraction surface in a select orientation relative to the grating mount and a spherical surface having a radial center at a point on the diffraction surface of the grating. A receptacle on the frame has a surface which is conical about a central axis receiving the spherical surface of the grating mount with the optical axis intersecting the point on the refractive surface of the grating. A clamp or stay is operatively associated with the grating mount and the frame for fixing the grating mount relative to the frame with the diffraction surface in a select orientation relative to the optical axis.

A third aspect of the present invention is a method of optically aligning a (de)multiplexer for fiber optic communications systems. The (de)multiplexer includes a diffraction grating having a diffraction surface for dividing a multichannel incident beam into single channel beams, a waveguide array including a plurality of waveguides having an input/output end for receiving the single channel beams, and a focusing optic in optical communication between the diffraction grating and the waveguide array along an optical axis, the focusing optic focusing the single channel beams from the diffraction surface of the grating for optical coupling with the input/output ends of the waveguides. The method includes fixing the focusing optic to a frame of the (de)multiplexer to define an optical axis of the (de)multiplexer corresponding to the optical axis of the focusing optic, moving the waveguide array relative to the focusing optic linearly along the optical axis and moving the grating only by rotating the grating about three orthogonal axes at a point on the grating surface intersected by the optical axis.

The bulk optic (de)multiplexer of the present invention provides a combination of fixed and adjustable mounts which eases alignment of the (de)multiplexer optical elements. The fixed mount of the focusing lens allows the optical axis of the focusing lens to define a reference about which the other optical elements can be aligned. The adjustable mount between the grating and the frame not only provides for gimbaled movement of the grating about a point on the grating surface intersected by the optical axis to aid in proper alignment of the grating, it also provides a structure which prevents a change of orientation of the grating relative to the optical axis while providing movement of the grating only along the optical axis due to temperature changes or clamping of the adjustable mount. The adjustable mount associated with the waveguide array allows for independent movement of the waveguide array along the optical axis and for independent movement of the waveguide array in a plane normal to the optical axis. This independence of movement further facilitates efficient alignment. The apparatus further facilitates the claimed method of aligning the (de)multiplexer which simplifies and expediates alignment of the optical elements.

DETAILED DESCRIPTION OF THE INVENTION

Figure 1:
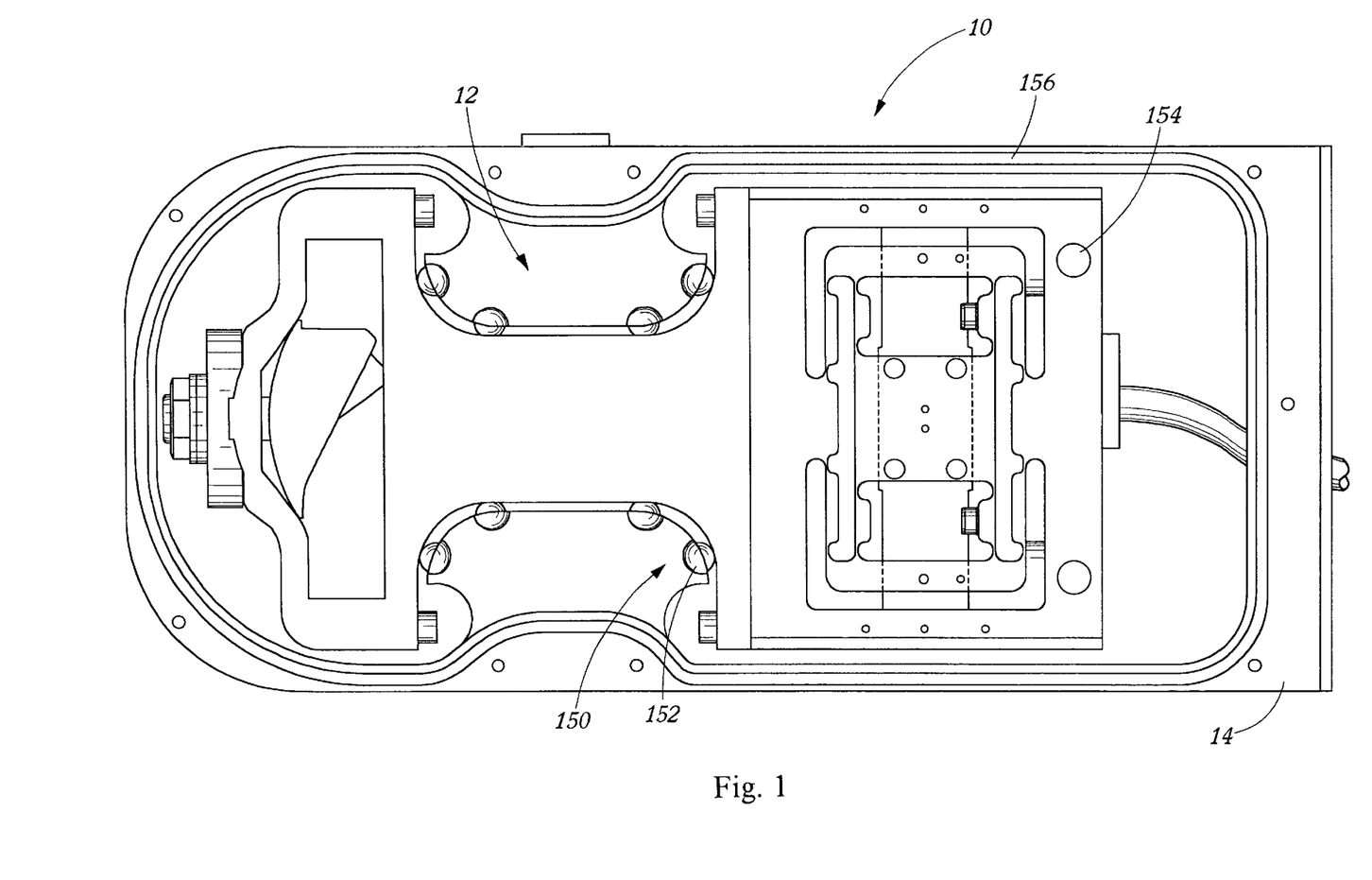
FIG. 1 is a plan view of a (de)multiplexer in accordance with the present invention with the top of the (de) multiplexer housing cut away.

FIG. 1 is a plan view of a (de)multiplexer in accordance with the present invention. A (de)multiplexer frame 12 resides within a housing 14. The housing 14 consists of a top and a bottom portion that fit together in a sealing relationship as will be described in greater detail below. In FIG. 1 the top portion has been removed to reveal the (de)multiplexer frame.

Figure 2:
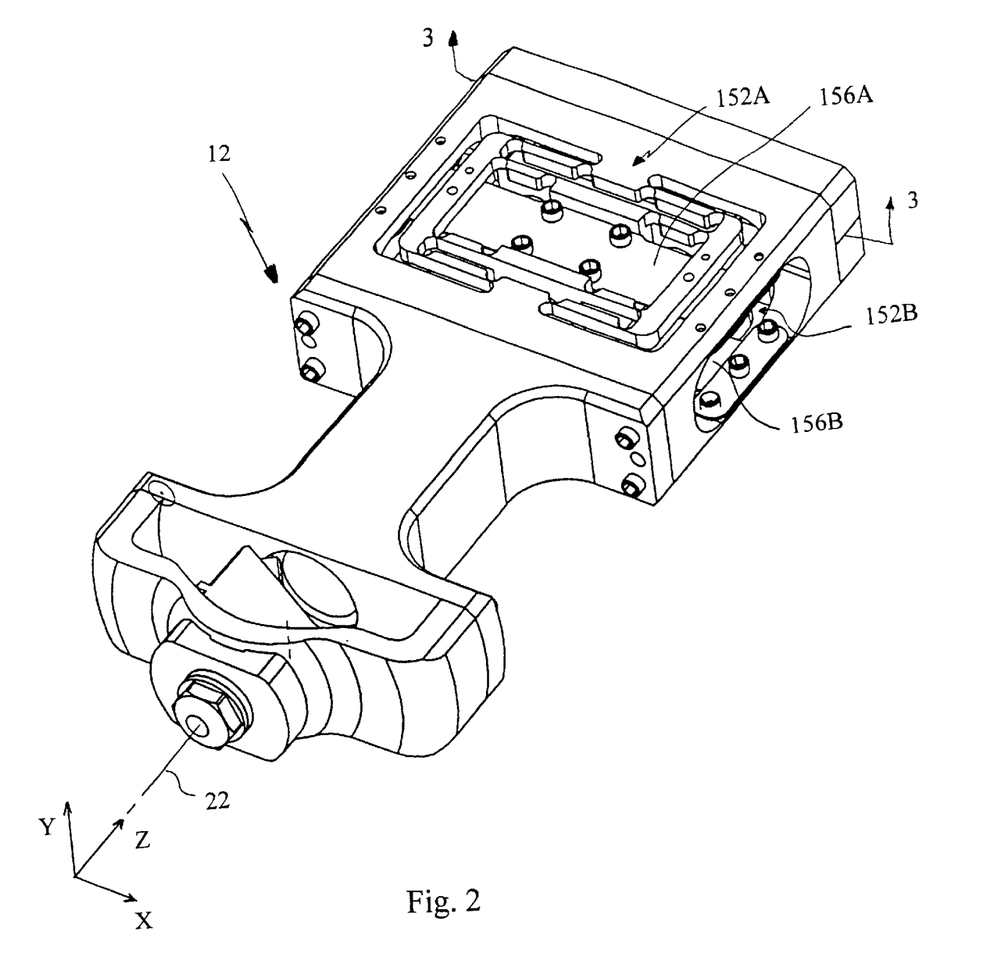
FIG. 2 is a perspective view of a (de)multiplexer frame in accordance with the present invention.

The (de)multiplexer frame 12 is shown in perspective removed from the housing 14 in FIG. 2. The (de)multiplexer frame maintains the optical elements of the (de)multiplexer in optical alignment. FIG. 2 also includes a depiction of orthogonal X, Y, Z axes which will be used as reference axes throughout this description. The Z axis is collinear with the optical axis 22.

Figure 3:
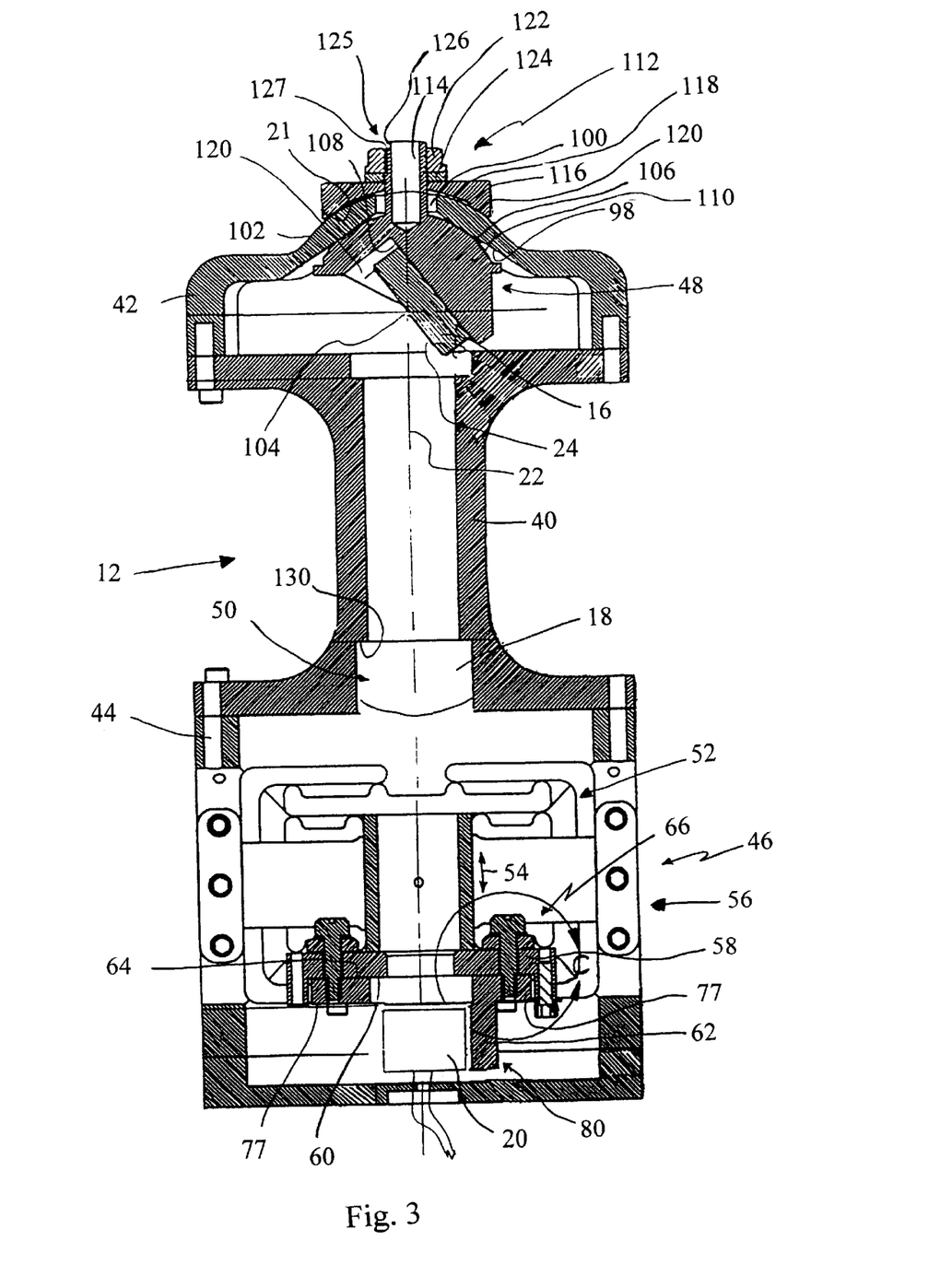
FIG. 3 is a cross-section of the (de)multiplexer frame of FIG. 2 taken along line 3—3 of FIG. 2.

Referring to FIG. 3, the optical elements of the (de) multiplexer include a wavelength dispersive element 16, a focusing optic 18, and a waveguide array 20. The wavelength dispersive element, the focusing optic, and the waveguide array are maintained by connection to the frame in optical communication with one another along an optical axis 22. Thus, the elements are in what is commonly known as littrow alignment.

The wavelength dispersive element 16 is preferably a reflective diffraction grating formed using conventional techniques from a glass substrate having a negligible coefficient of thermal expansion. One preferred substrate material is ZERODUR, manufactured by the Schott Company. A diffraction surface 24 of the grating has a large number of grooves which are formed parallel to a Y axis normal to the cross-sectional plane of FIG. 3. The grooved surface has a highly reflective coating, such as gold. Representative gratings include echellette and preferably echelle gratings, as are disclosed in commonly assigned, copending U.S. patent application Ser. No. 09/628,774, entitled "Echelle Grating Dense Wavelength Division Multiplexer/Demultiplexer", the contents of which are incorporated in their entirety herein.

The focusing optic 18 is preferably a spherical symmetric doublet lens, although other lens structures could be suitable as well. The spherical symmetric doublet lens has a select focal length within a relatively narrow range of tolerance along an optical axis. The lens also has a refractive index that varies a known amount as a function of temperature. Furthermore, the lens surfaces deform in a predictable manner with changes in temperature.

Figure 4:
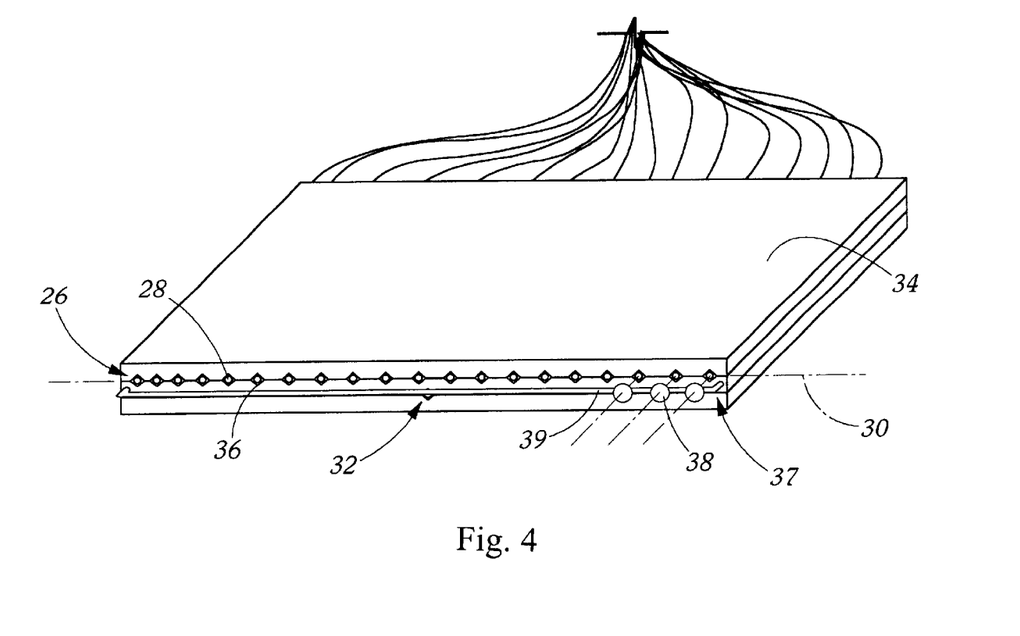
FIG. 4 is a schematic perspective view of an optical fiber waveguide array used in the present invention.

The waveguide array 20 is shown in greater detail in FIG. 4. The waveguide array 20 consists of a number of single channel waveguides 26 having an input/output end 28 with the input/output ends 28 aligned along an input/output end axis 30 and a multiplex or multi-channel waveguide 32 vertically below and at the center of the single channel waveguides 26. Other embodiments known in the art, such as having the multiplex waveguide coincident with the input/output end axis or above it, may also be suitable. Also, stacked multiplex waveguides and single channel arrays (as described in U.S. patent application Ser. No. 09/628,774) may be used with the invention described herein. For the sake of simplicity, a limited number of single channel waveguides, here, 20, have been shown as comprising the waveguide array. The preferred embodiment will have many more single channel waveguides, such as 48 or more. In the preferred embodiment the single channel waveguides 26 and the multiplex waveguide 32 are all single mode optical fibers. The fibers are held in place between two pieces of a silicon substrate or wafer 34 having V-shaped grooves 36 which are precisely etched in the substrate pieces to maintain the single channel fibers at a precise desired spacing from one another. The silicon is preferably high purity prime grade. Likewise, the multiplex optical fiber 32 is held in a precise location relative to the single channel optical fibers by a third piece of silicon substrate with an appropriate V groove. As stated above, the input/output ends of the single channel fibers terminate along an input/output end axis 30, and this axis is in the same plane as the input/output end of the multiplex waveguide 32. As shown in FIG. 4, the spacing of the waveguides increases slightly from left to right so as to couple with the corresponding single channel beams which increase in separation in a like manner. In the preferred embodiment the dimensions of the assembled substrate are 15 mm along the X axis, 1.5 mm high and 12 mm deep.

In order to simplify alignment and increase alignment tolerances, a microlens array 37 may be incorporated into the substrate. The microlens array also increases band pass. The microlens array consists of a focusing lens 38 along an optical axis of each waveguide, with the lenses coupled by a frame 39 attached to the substrate 34 made of a material having a CTE matching that of the substrate 34 to thermally expand with the substrate to promote optical coupling along the waveguide optical axes.

The (de)multiplexer frame 12 of the preferred embodiment includes a telescope portion 40, a cone housing portion 42 attached to one end of the telescope portion by conventional fasteners such as screws, and a flexure portion 44 similarly attached to the other end of the telescope portion 40. Alternatively, the frame could be a single integral piece, two pieces or more than three pieces. The multiplexer frame 12 further includes a first adjustable mount 46 associated with the flexure portion 44, a second adjustable mount 48 associated with the cone housing portion 42 and a fixed mount 50 within the telescope portion 40.

The first adjustable mount 46 consists of a flexure 52 which is movable axially within a limited range (±1 mm) only along a Z axis as indicated by the arrow 54. In the preferred embodiment the flexure is integrally formed of the flexure portion of the frame, but it could also be a separate structural element affixed to the frame by suitable connectors. As seen in FIG. 2, the preferred embodiment includes identical top and bottom flexure elements 52A and 52B to prevent tipping of the waveguide array as the flexure is moved along the Z axis. A single flexure element suitably arranged could perform the same function as well and is within the scope of the invention. Other structures for providing movement only along the Z axis may be suitable as well. A noninfluencing lock piece assembly 56 preferably connects the flexure 52 to the flexure portion of the frame so that the flexure 54 can be secured in a select position along the Z axis. Referring to FIG. 2, the preferred embodiment uses two noninfluencing lock piece assemblies 56A and 56B, one on the top and one on the bottom of the flexure with each assembly secured on opposite sides of the frame. Other stay structures or clamps may be used instead of the noninfluencing lock piece, but substitutes would preferably also not influence the Z axis position as they are secured.

Figure 5:
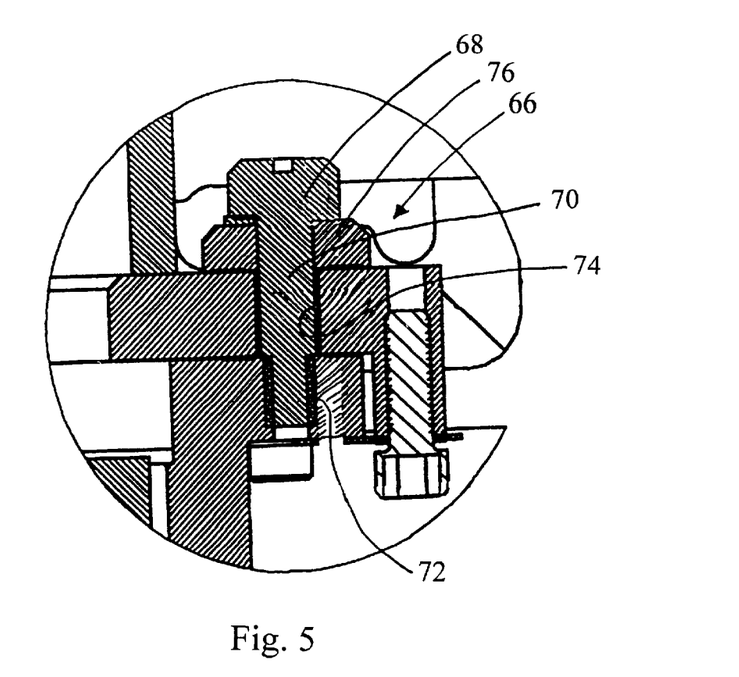
FIG. 5 is an enlarged cross-section of a slidable connection between fixed and moving X, Y stages.

The first adjustable mount 46 further consists of a fixed X, Y stage 58 which is fixedly attached to the Z axis flexure 52 by screws or the like (not shown) so that the first X, Y stage moves with the Z axis flexure 52. The fixed X, Y stage 58 has a planar surface 60 substantially normal to the optical axis 22. A moving X, Y stage 62 has a planar surface 64 which abuts the planar surface 60 of the fixed X, Y stage 62. The planar surfaces can be moved relative to one another parallel to the X, Y axis by virtue of sliding connectors 66, and the planar surfaces are preferably anodized aluminum to facilitate sliding. A sliding connector 66 is shown in greater detail in FIG. 5. The sliding connector 66 consists of a bolt 68 having a shaft body 70 and a threaded tip 72. The threaded tip 72 is threadably engaged in a threaded hole 74 in the moving X, Y stage 62. The shaft body 70 resides in a hole 74 in the fixed X, Y stage 58 having an inner diameter greater than the outer diameter of the shaft body 70 to allow a desired degree of freedom of movement of the moving X, Y stage relative to the fixed X, Y stage in an X, Y plane. In the preferred embodiment this is about ±0.5 mm of movement. A washer 76 resides between the head of the bolt 68 and a planar surface of the fixed X, Y stage 58 opposite the planar surface 60. To facilitate movement of the moving X, Y stage 62 relative to the fixed X, Y stage 58, the washer 76 has an annular trough abutting the fixed X, Y stage which is filled with tiny glass beads having a diameter slightly greater than the depth of the annular trough encased in suitable grease. Thus, the sliding connector 66 allows limited movement between the moving X, Y stage and the fixed X, Y stage within an X, Y plane with minimal friction induced sticktion between the planar surfaces of the stationary and moving stages. The moving X, Y stage is secured in place by noninterfering lock pieces 77 on opposing sides of the moving X, Y stage, or other suitable stays or clamps. The non-interfering lock piece assemblies 56 and 77 collectively form a stay for the first adjustable mount 46. By the combination of the Z axis flexure 52 and the sliding connector 66 between the fixed X, Y stage and the moving X, Y stage, the moving X, Y stage and the associated waveguide array 20 may be moved axially of the Z axis, rotated about the Z axis, and moved linearly within an X, Y plane normal to the Z axis. In addition, the waveguide array 20 can be moved independently along the Z axis. In other embodiments, the first adjustable mount might be limited to the Z axis flexure (or some other structure providing movement along the Z axis) without the moving X, Y stage, or vice versa.

Figure 6:
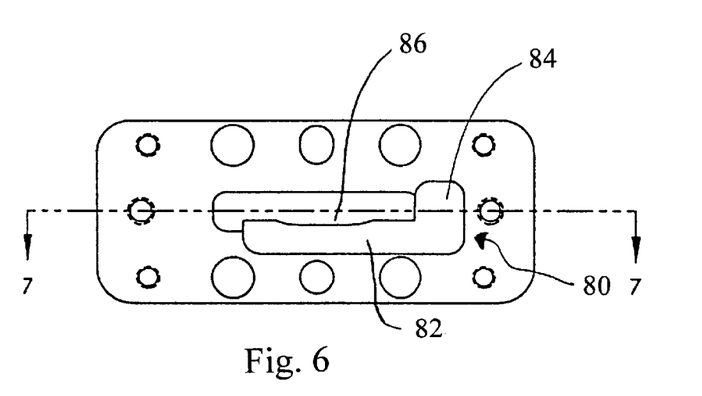
FIG. 6 is a front elevation view of a moving X, Y stage in accordance with the present invention.
Figure 7:
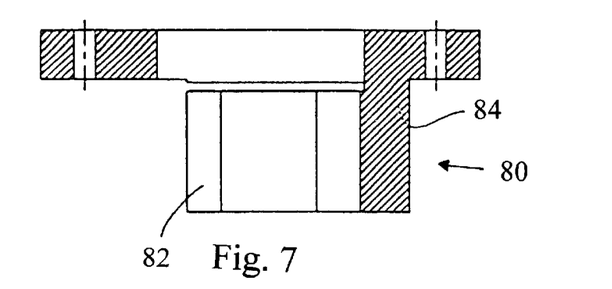
FIG. 7 is a cross-section view of the moving X, Y stage of FIG. 6 taken along line 7—7 of FIG. 6.

The moving stage is shown in greater detail in FIG. 6 and FIG. 7. FIG. 6 is a front elevation view of the moving X, Y stage and FIG. 7 is a sectional view taken along line 7—7 of FIG. 6. A cantilevered connector 80 extends from the moving X, Y stage from a side opposite and in a direction normal to the planar surface 64. The cantilevered connector 80 consists of a platform 82 which extends in a cantilevered manner from a post 84. The top surface of the platform has a recess 86.

Figure 8:
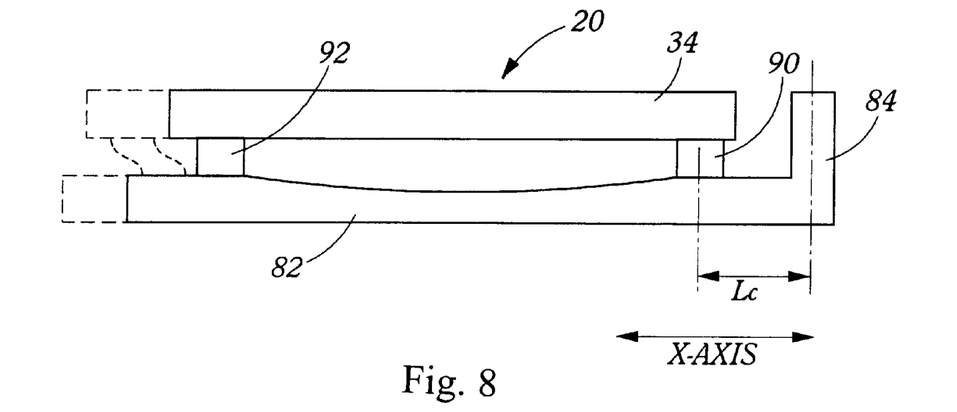
FIG. 8 is a front elevation view of a waveguide array attached to the cantilevered platform of the movable X, Y stage in accordance with the present invention.

FIG. 8 illustrates how the waveguide array 20 is attached to the platform 82 by a flexible connector 88 which allows the waveguide array to expand when heated relative to the platform 82. In the preferred embodiment the flexible connector 88 consists of a rigid connection 90 between a bottom of the substrate 34 near the post 84 and an elastic connection 92 near the distal end of the cantilevered platform 82. The rigid connection 90 is made by a suitable rigid curing epoxy and the flexible connection 92 is made by a suitable elastic curing epoxy. The waveguide array 20 is epoxied in place bringing the waveguide array into registration with appropriate guides and spacers (not shown) associated with the platform 82. Both the rigid and elastic curing epoxies have virtually identical thermal coefficiencies of expansion to preventing tipping of the waveguide array 20 about a Z axis by changes in temperature.

Figures 10, 11, 12:
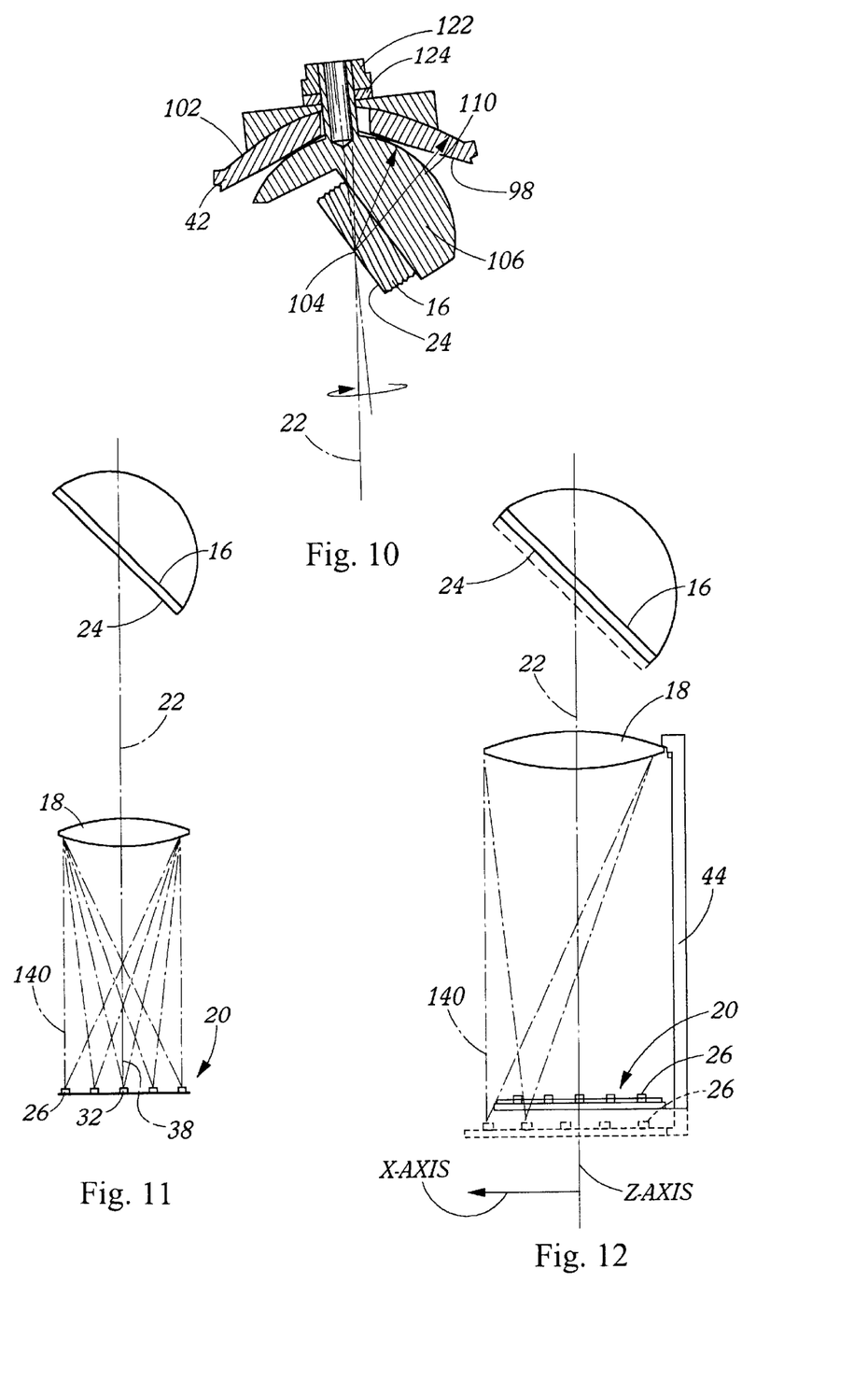
FIG. 10 is a sectional view illustrating pivoting of the grating holder about the optical axis.
FIG. 11 is a schematic representation of a properly aligned (de)multiplexer.
FIG. 12 illustrates movement of the focal points of single channel beams as a function of an increase in temperature along with the movement of the waveguide array as a function of increase in temperature to maintain coupling with the single channel beams.

The second adjustable mount 48 includes the rear wall of the cone housing portion 42 of the frame 12 having a concave and preferably a conical recess or receptacle 98 formed therein. The conical recess 98 is symmetric about a central axis which is preferably collinear of very close to collinear with the optical axis 22. A circular hole 100 having a central axis along the optical axis 22 extends from the conical wall of the conical recess 98 through the rear wall. The surface 25 of the rear wall opposite the conical recess 102 is spherical and has a radial center which preferably is at about a point 104 where the optical axis 22 intersects the diffraction surface 24 of the grating 16. The second adjustable mount 48 further includes a grating mount 106 having a leading planar surface 108 and a trailing spherical surface 110. The spherical surface 110 may include a low friction coating 111 such as PTFE or carbide. The spherical surface 110 has a radial center at the point 104 where the optical axis intersects the diffraction surface 24 of the grating with the trailing spherical surface 110 nested in the conical recess 98. A clamp assembly or stay 112 secures the grating mount 106 with its spherical surface engaging the conical recess 98 as illustrated in FIG. 3. The clamp preferably consists of a threaded tail 114 which extends along a central axis of the spherical surface through the hole 100 in the rear wall of the cone housing. A washer 116 having a spherical recess 118 including an annular contact rib 120 resides between the spherical wall 102 and a locking nut 122 with the contact rib 120 contacting the spherical wall 102. The contact rib 120 has a low friction coating 121 such as PTFE or carbide. A spring washer 124 is preferably provided between the locking nut and the spherical washer 116. The spring washer 124 allows the locking nut to be loosened somewhat while the clamp assembly 112 is still held in position so that the grating mount 106 can be repositioned. As should be clear from FIG. 3, the cooperation between the spherical surface of the grating mount and the conical recess 98 allows for true gimbaled movement of the diffraction surface of the grating about the point 104. In other words, the grating can be rotated about the point 104 along orthogonal three axes within a limited range of motion. This is illustrated in FIG. 10. A notch 125 at the distal end of the threaded tail 114 defines a first planar surface 126 in an Z, Y plane and a second planar surface 127 in an X, Y plane as depicted in FIG. 3, parallel to the grooves of the grating 16, to facilitate course alignment of the grating 16.

Figure 9:
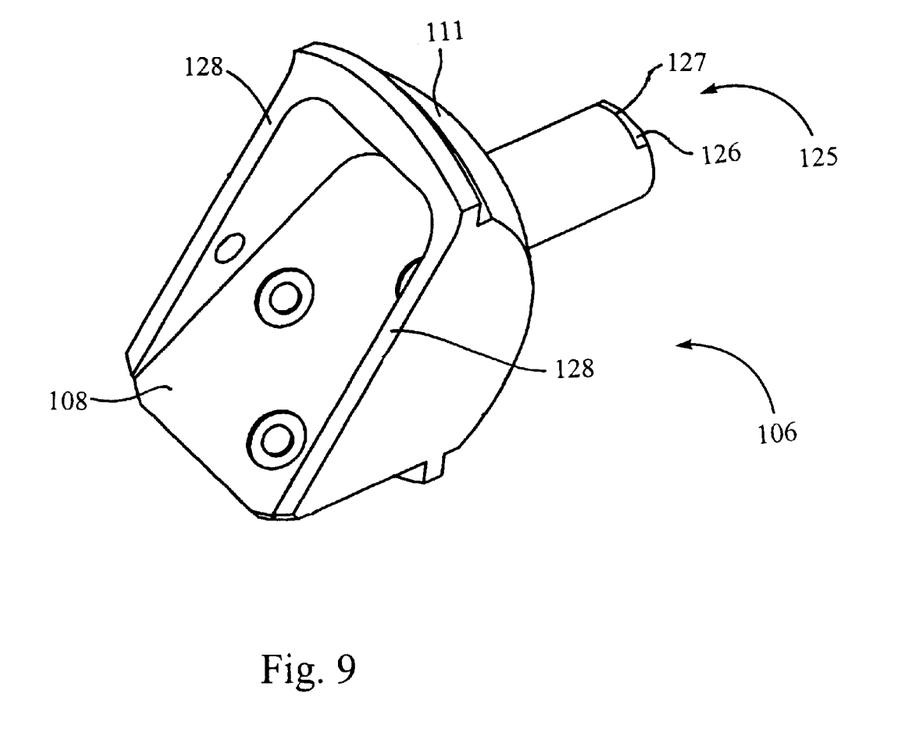
FIG. 9 is a perspective view of a grating holder depicted in FIG. 3.

The grating mount 106 is shown in a perspective view in FIG. 9. Extending on either side of the leading planar surface 108 are standing ribs 128. The standing ribs 128 are included to ensure that as the grating holder is subjected to changes in temperature, it expands and contracts along the optical axis 22 with the diffraction surface of the grating maintaining its orientation relative to the optical axis 22, as illustrated schematically in FIG. 12. The grating mount is preferably made of titanium or 416 stainless steel to ensure rigidity and strength, although other low CTE materials such as INVAR, KOVAR or ZERODUR may be used as well.

The grating is attached to the leading planar surface 108 by a suitable epoxy and is positioned on the leading surface in a select orientation by registration with an inner wall of the standing ribs 128 and suitable spacers.

FIG. 10 illustrates gimbaled movement of the diffraction surface about the point 104. With the grating mount 106 tilted relative to the optical axis 22 as shown in FIG. 10, the point 104 is still intersected by the optical axis 22. Also, the washer 100 is self-aligning relative to the spherical surface 102 to maintain complete contact of the annular contacting rib 120 with the spherical surface. This structure also keeps a ring of contact of the washer opposite that of the spherical surface 110 of the holder to minimize distortion of the cone housing. While in the preferred embodiment the spherical surface 100 and conical recess 98 have central axes along the optical axis 22, their central axes could be non-colinear with the optical axis and still allow for the desired gimbaled movement.

The fixed mount 50 simply consists of an enlarged inner diameter portion 130 of the telescope portion 40 of the frame 12. The focusing optic 18 is axially inserted in this enlarged diameter of portion 130 and secured in place by an appropriate adhesive or held in place by an appropriate mechanical clamp suitable for maintaining the optical alignment over a wide temperature range, e.g., −5° C.–65° C.

The optical elements of the (de)multiplexer 10 are aligned as follows. First, the lens 18 is brought into registration with the wall at the end of the larger diameter portion of the fixed mount 130 and the optical axis of the lens defines the optical axis 22 of the (de)multiplexer. The lens is then cemented or clamped in place. The grating is coarsely aligned by having the first surface 126 parallel to the Z, Y reference plane and the second surface 127 parallel to the X, Y reference plane. The moving X, Y stage is coarsely aligned simply by connection of the X, Y moving stage to the X, Y fixed stage with waveguide array attached to the X, Y moving stage as discussed above. Following coarse alignment, the optical elements are close to littrow alignment. In the preferred embodiment, an actuator for moving the Z flexure along the Z axis is operatively associated with the Z flexure, an actuator for moving the X, Y moving plate along the X axis is associated with the X, Y moving plate, and an actuator for moving the X, Y moving plate along the Y axis is associated with the X, Y moving plate. Likewise, an actuator for each rotational degree of movement of the second adjustable mount is operatively associated with the grating mount 106. A multiplex beam of the operative wave band of light is propagated to the multiplexer through the multiplex optical fiber 32. Photo detectors are associated with the end single mode fibers to monitor light output at these points. Alternatively, the actuators could combine one or more degree of movement. An automatic alignment device utilizing a six axis feed back loop controlled algorithm controls actuation of each actuator to move the grating and waveguide array relative to the optical axis to optimize optical signal strength at the extreme ends of the single channel array. First the beam strength is optimized at one end of the signal channel array and then the other by coordinated movements of the six actuators by the automatic alignment device until signal strength in these single channel optical fibers is maximized. Then the first and second adjustable mounts 46, 48 are clamped into place as described above.

The multiplexer 10 is also configured so that "optical coupling" or the coupling integrity, that is efficiency and the level of crosstalk, remain within acceptable specified levels within a relatively wide range of temperatures, more particularly from about −5° C. to 65° C. For example, for efficiency, loss should not increase greater than 0.5 db and cross-talk should not increase more than 5 db. The problem addressed by the unique "athermalized" frame of the present invention is illustrated schematically in FIG. 11 and FIG. 12. Referring to FIG. 11, with the multiplexer properly aligned and with the (de)multiplexer temperature at room temperature, that is about 20° C., light from the multichannel or multiplex waveguide 32 is projected as a multichannel beam to the focusing optic 18 which collimates the multi-channel beam and directs it off the diffraction surface 24 of the grating 16. The diffraction grating divides the multi-channel beam by wavelength into a number of single channel beams which are diffracted off the diffraction surface 24 to the focusing optic 18 which directs the focused singled channel beams to select focal points for optical coupling with the input/output ends of the single channel waveguides 26.

FIG. 12 illustrates the effect of an increase in temperature on the beams 140. As temperatures increase the refractive index of the lens 18 decreases and the surfaces of lens are slightly deformed so as to cause the focal length of the lens 18 to increase. Thus, the select focal points extend beyond the plane of the input/output ends of the optical fibers 26, 32. At the same time, there is a change in the refractive index of the air occupying the space between the diffraction grating 16 and the lens 18 and the air between the lens 18 and the waveguide array 20. This change in the refractive index of the air causes a lateral shift of the select focal points of the single channel beams 140 along the X axis as is also illustrated in FIG. 12. If the temperature change is great enough, the location of the focal points of the single channel beams can move far enough out of alignment with the input/output ends of the single channel fibers 26 to significantly degrade the efficiency of optical coupling, leading to an unacceptable loss of efficiency and to crosstalk.

In the preferred embodiment, temperature changes result in both axial and radial movement of the focal points as a function of temperature. In alternate embodiments, some form of athermalization could eliminate either the radial or axial movement. In such alternate embodiments, it would be necessary only to provide for a corresponding movement of the input/output ends of the waveguides.

Although the position of the grating may move along the optical axis as a result of temperature changes expanding or contracting the frame between the lens and the grating and thermal expansion or contraction of the grating holder itself, the light in this region is collimated so these movements have no optical effect. Also, as discussed above, the grating substrate is athermal (negligible CTE) and the grating holder is configured to maintain the orientation of the diffractive surface of the grating as the grating holder is subjected to temperature changes. Thus, the grating itself is believed to be insensitive to temperature changes for alignment purposes.

To address the problem of migration of the focal points as a function of changes in (de)multiplexer temperature, the frame 12 of the (de)multiplexer includes a number of novel CM) features. First, the frame is made of a thermally expansive material, for example, an aluminum alloy such as 6061 T6 having a coefficient of thermal expansion (CTE) that allows the frame to vary in length as a function of temperature. Briefly, the change in length as a function of temperature is determined by the well known equation $\Delta L=L \alpha \Delta T$, where $\Delta L$ is the change of length, L is the length of the thermally expansive material, $\alpha$ is the coefficient of thermal expansion of the thermally expansive material, and $\Delta T$ is the change in temperature. Herein the terms "thermally expansive" and "thermal expansion" and the like are used to mean both expansion or contraction, with the $\Delta L$ being positive or expansive as temperature increases and $\Delta L$ being negative or there being a contraction as the temperature decreases, unless the context clearly indicates it is intended to be limited to an expansion, such as where the term is associated with an increase in (de)multiplexer temperature. The frame 12 is symmetric about the optical axis 22 to provide equal lengths L of material along the optical axis 22, and therefore uniform expansion along the optical axis with changes in (de)multiplexer temperature. Thus, in the preferred embodiment the telescope portion of the frame 40, the cone portion 42 of the frame and flexure portion 44 of the frame are all symmetric about the optical axis. As a result, these portions of the frame change length only along the optical axis 22, simplifying maintaining alignment during temperature induced length changes. Most importantly, the length of frame material connecting the lens 18 and the waveguide array 20 along with the material(s) from which this portion of the frame is made are selected to provide a length L and CTE such that the length along the optical axis of the portion of the frame between the waveguide array and the lens changes with temperature about the same amount that the focal length of the single channel focusing beams changes as a function of temperature to maintain optical coupling of the focusing points and the input/output ends of the single channel fibers.

To compensate for the lateral shift along the X axis of the single channel beams 140 caused by a change in temperature of the air, the structure is similar in principle. Referring first to FIG. 8, the substrate 34 of the waveguide array 20 is a thermally expansive material so that increases in temperature will cause it to expand and decreases in temperature will cause it to contract along the X axis. To move the input/output ends of the single channel waveguides the same direction as the lateral shift of the beams with temperature, the flexible connector 88 includes the first end of the substrate 34 having a rigid connection 90 to the cantilevered connector 80 near the post 84 and an elastic connection 92 near the distal end of the cantilevered connector 80. As a result, as the substrate 34 grows along its X axis as a function of increases in temperature, the substrate will expand toward the elastic connection 92, causing distortion of the elastic connection 92 as illustrated in phantom lines in FIG. 8. This will provide some of the lateral shift in a direction along the X axis necessary to move the input/output ends of the single channel fibers into the desired degree of optical coupling with the focal points of the single channel signals 140. To further move the input/output ends along the X axis, in the preferred embodiment the cantilevered connector 80 is also made of a thermally expansive material such as an aluminum alloy. Referring to FIG. 8, the distance between the midpoint of the post 84 and the rigid connection 90 ($L_c$) will provide further lateral displacement of the waveguide array along the X axis with changes in temperature. The amount of change, ΔL will be determined as follows: $\Delta L_c = L_c \alpha \Delta T$. Thus, the distance $L_c$ as well as the coefficient of thermal expansion of the material from which the cantilevered connector 80 is made can be adjusted to provide sufficient movement along the X axis to insure the maintenance of optical coupling between the single channel beams 140 and the input/output ends of the single channel fibers 126.

While the preferred embodiment compensates for lateral shift along the X axis by combining the thermal expansion of the waveguide substrate and the cantilevered connector, in other embodiments either one may provide the necessary lateral shift to maintain suitable optical coupling, and the other could be "athermalized." For example, the flexible connector between the substrate and the cantilevered connector could have two elastic connections (and no rigid connection) so that only thermal expansion of the cantilevered connector 80 moves the input/output ends a significant amount to maintain optical coupling. Or, the cantilevered connector 80 could be modified to not be cantilevered or it could be made of an athermal material so optical coupling is maintained solely by thermal expansion of the waveguide substrate.

FIG. 12 also illustrates schematically the effect of temperature on the grating mount 106. As discussed above and as illustrated in FIG. 12, the standing ribs 128 insure that the grating mount 106 will move the diffraction grating 16 along the optical axis 22 while maintaining the diffraction surface 24 in the same select orientation relative to the optical axis 22.

Referring back to FIG. 1, vibration damping supports 150 support the (de)multiplexer frame 12 within the housing 14. The vibration damping supports 150 include vertical supports 152 and horizontal supports 154. Both the vertical and horizontal supports 152, 154 are positioned to suspend the frame within the housing. The vertical and horizontal supports 152, 154 are made of an elastomeric material of a select formulation chosen to dissipate vibrations most likely to be encountered by the (de)multiplexer 10. Representative vibrations of concern would be low frequency vibrations such as might be incurred in an earthquake, middle frequency vibrations such as might be incurred during transport of the assembled (de)multiplexers and high frequency vibrations which might be generated by cooling fans and the like deployed in the vicinity of the multiplexer in operation. Representative materials for the vibration damping supports include natural and synthetic rubber, urethane and other polymeric elastomers, with urethanes being preferred. Choice of a particular material would be a function of many factors, including anticipated frequencies, anticipated temperatures, mass of the (de)multiplexer and the like.

Although not shown, a top housing piece mates with the bottom housing piece illustrated in FIG. 1. A seal is deployed between the housing segments so that the interior of the housing can be pressurized with nitrogen or another suitable gas to minimize the risk of corrosion of sensitive optical and mechanical parts as well as to provide for a uniform gaseous medium through which the beams are transmitted within the (de)multiplexer.

We claim:

1. A (de)multiplexer for fiber optic communications systems comprising:
    a diffraction grating having a diffraction surface;
    a waveguide array including a plurality of waveguides having an input/output end for emitting and receiving optical signals;
    a focusing optic in optical communication between the diffraction grating and the waveguide array along an optical axis, the focusing optic focusing beams from the diffraction surface of the grating for optical coupling with the input/output ends of the waveguides;
    a frame;
    a fixed mount between the focusing optic and the frame;
    a first adjustable mount between the waveguide array and the frame; and
    a second adjustable mount between the diffraction grating and the frame.

2. The (de)multiplexer of claim 1 wherein the optical axis corresponds to a Z axis of orthogonal X, Y, Z axes and the waveguides of the waveguide array are aligned with the input/output ends along an input/output axis, the first adjustable mount being configured to provide for linear movement of the waveguide array along the Z axis.

3. The (de)multiplexer of claim 2, the first adjustable mount being configured to provide for movement of the input/output axis within a plane parallel to the X, Y axes.

4. The (de)multiplexer of claim 1, the second adjustable mount being configured to provide only for gimbaled movement of the grating about a point on the diffraction surface of the grating intersecting the optical axis.

5. The (de)multiplexer of claim 2, the second adjustable mount being configured to provide only gimbaled movement of the grating about a point on the diffraction surface of the grating intersecting the optical axis.

6. The (de)multiplexer of claim 1 further comprising a first stay between the first adjustable mount and the frame selectively securing the first adjustable mount with the input/output ends in a select orientation relative to the focusing lens and a second stay between the second adjustable mount and the frame selectively securing the second adjustable mount with the diffraction surface of the grating in a select orientation relative to the lens.

7. The (de)multiplexer of claim 2, the first adjustable mount comprising a flexure.

8. The (de)multiplexer of claim 7, the first adjustable mount further comprising a fixed stage fixedly attached to the flexure, the fixed stage having a planar surface parallel to the X, Y axes, a moving stage to which the waveguide array is attached, the moving stage having a planar surface, and a compression connector maintaining the planar surface of the fixed stage in sliding abutment with the planar surface of the moving stage.

9. The (de)multiplexer of claim 1 wherein the second adjustable mount comprises:
    a grating mount having a leading surface to which the grating is attached with the diffraction surface in a select orientation relative to the grating mount and a spherical surface having a select radius about a point on the diffraction surface of the grating; and
    a concave surface on the frame receiving the spherical surface of the grating mount with the optical axis intersecting the point on the diffraction surface of the grating.

10. An attachment assembly for attaching a diffraction grating having a diffraction surface of an optical (de)

multiplexer to a frame of the (de)multiplexer, the (de)multiplexer having optical elements in addition to the grating, the optical elements being attached to the frame and optically aligned along an optical axis, the attachment assembly comprising:

- a grating mount having a leading surface to which the grating is attached with the diffraction surface in a select orientation relative to the grating mount and a spherical surface having a select radius about a point on the diffraction surface of the grating;
- a receptacle on the frame having a surface which is conical about a central axis, the receptacle receiving the spherical surface of the grating mount with the optical axis intersecting the point on the diffraction surface of the grating; and
- a clamp operatively associated with the grating mount and the frame for fixing the grating mount relative to the frame with the diffraction surface in a select orientation relative to the optical axis.

11. The attachment assembly of claim 10 wherein the grating mount further includes a central axis of the spherical surface, the spherical surface being situated on the grating mount with the central axis generally aligned with the optical axis of the (de)multiplexer.

12. The attachment assembly of claim 11 further comprising the grating mount having a threaded tail extending along the optical axis and the receptacle being formed in a wall of the frame normal to the optical axis with the central axis of the conical surface generally aligned with the optical axis of the (de)multiplexer, the threaded tail being received in a hole about the central axis of the conical surface, the hole extending through the wall, the clamp comprising a nut threadably engaging the threaded tail, whereby the grating mount is fixed relative to the frame by tightening the nut.

13. The attachment assembly of claim 12 wherein the clamp further comprises a convex outer surface formed in the wall of the housing on a side opposite the conical surface and a washer having a concave washer surface mating with the convex outer surface, the washer being received on the treaded tail between the convex outer surface and the nut.

14. The attachment assembly of claim 10 further comprising a low friction coating on the spherical surface.

15. The attachment assembly of claim 13 further comprising a low friction surface coating on the concave washer surface.

16. The attachment assembly of claim 10 further comprising the grating mount having a spherical surface central axis and the receptacle being formed in a wall of the frame normal to the optical axis with the conical surface central axis and the spherical surface central axis aligned with the optical axis of the (de)multiplexer, the grating mount being made of a thermally expansive material and dimensioned to expand and contract along the optical axis when subjected to changes in temperature while maintaining the diffractive surface in a select orientation relative to the optical axis.

17. The attachment assembly of claim 12 further comprising indicia on the stem having a select orientation relative to the grating surface for coarsely aligning the grating.

18. A method of optically aligning a (de)multiplexer for fiber optic communications systems, the (de)multiplexer including a diffraction grating having a diffraction surface for dividing a multi-channel incident beam into a single channel beams, a waveguide array including a plurality of waveguides having an input/output end for receiving the single channel beams, a focusing optic in optical communication between the diffraction grating and the waveguide array along an optical axis, the focusing optic focusing the single channel beams from the diffraction surface of the grating for optical coupling with the input/output ends of the waveguides, and a frame, the method comprising:

- affixing the focusing optic to the frame with an optical axis of the focusing optic defining the optical axis;
- moving the waveguide array relative to the focusing optic only linearly along the optical axis; and
- moving the grating only by rotating the grating about three orthogonal axes at a point on the grating surface intersected by the optical axis.

19. The method of claim 18 further comprising moving the input/output ends of the waveguide array within a plane normal to the optical axis.

* * * * *